United States Patent [19]

Jacob et al.

[11] Patent Number: 4,776,400
[45] Date of Patent: Oct. 11, 1988

[54] OIL-WELL FLAP-TYPE SAFETY VALVE

[75] Inventors: Jean-Luc Jacob, Lescar; Jean-Claude Mousques, Navarrenx, both of France

[73] Assignee: Diamant Boart France SA Division Petrole, Serres Castet, France

[21] Appl. No.: 924,367

[22] Filed: Oct. 29, 1986

[30] Foreign Application Priority Data

Jul. 29, 1986 [FR] France .................................. 86 11421

[51] Int. Cl.⁴ ............................................. E21B 34/08
[52] U.S. Cl. ...................................... 166/321; 166/332
[58] Field of Search ................. 166/319, 321, 322, 332

[56] References Cited

U.S. PATENT DOCUMENTS

| 3,865,141 | 2/1975 | Young | 166/322 |
| 4,597,445 | 7/1986 | Knox | 166/319 |
| 4,641,707 | 2/1987 | Akkerman | 166/332 |

FOREIGN PATENT DOCUMENTS

| 2504616 | 8/1975 | Fed. Rep. of Germany | 166/322 |
| 3344480 | 6/1985 | Fed. Rep. of Germany | 166/319 |
| 0676798 | 7/1979 | U.S.S.R. | 166/319 |

Primary Examiner—Stephen J. Novosad
Assistant Examiner—Terry Lee Melius
Attorney, Agent, or Firm—Harold H. Dutton, Jr.

[57] ABSTRACT

An oil-well safety valve comprising a movable shutter flap, an inner tubular slide, a return spring for the slide, hydraulic means displacing the slide downward by pressuring a control fluid and a system for anchoring the valve in a receiving sleeve, the flap hinging on a shutter body (108) screwed on the lower end of the valve by means of a shaft (121) provided with a heel (123), the heel being locked by the low end of the valve when the shutter body is screwed on this valve, so that the shaft (121) is locked with respect to rotation and translation without resort to any other auxiliary component, and it is released when the shutter body (108) is unscrewed.

5 Claims, 4 Drawing Sheets

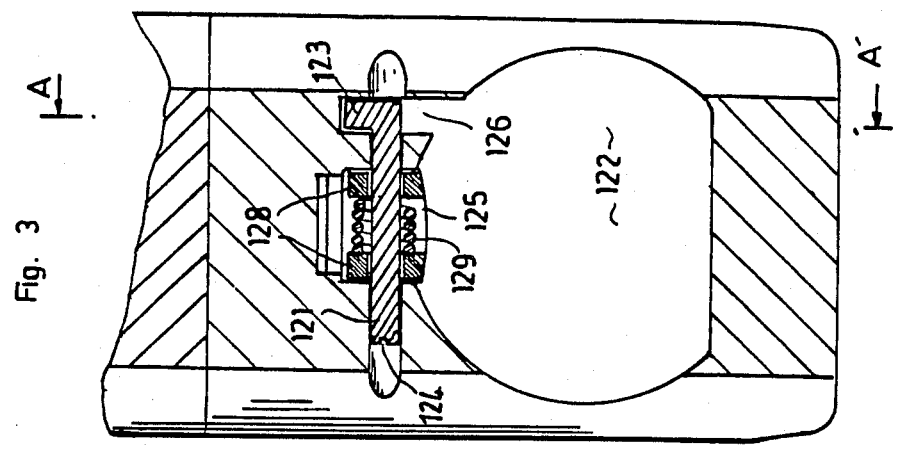
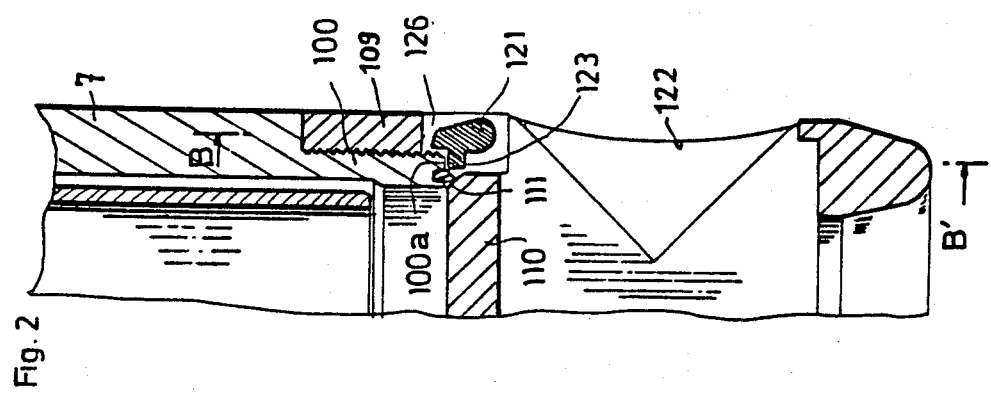

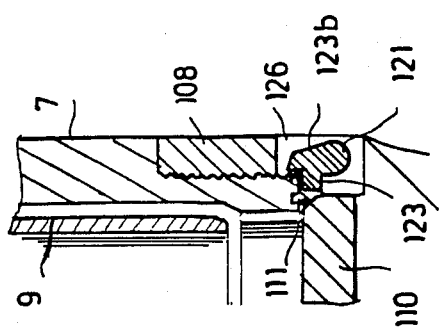
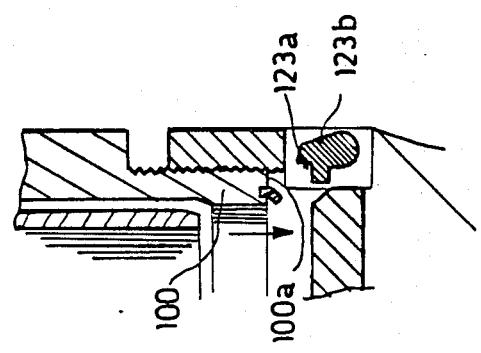
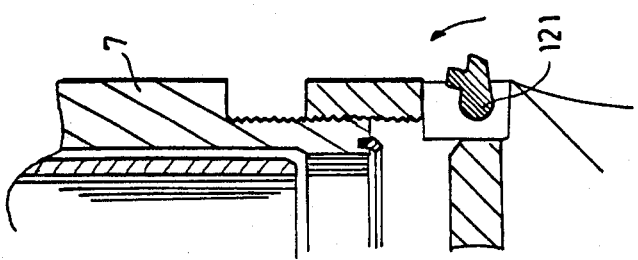

OIL-WELL FLAP-TYPE SAFETY VALVE

This invention relates to a safety valve to be inserted into an oil-well production pipe to close or open the pipe.

BACKGROUND AND OBJECTS OF THE INVENTION

The purpose of oil-well valves is to automatically stop effluent production in case of accident at the wellhead or downstream of it. The valves are hydraulically controlled to open from the surface and will automatically close due to a powerful return spring the moment there is a drop, controlled or accidental, of hydraulic pressure. Much research has been spent on these valves to improve them and they are widely used, in particular in offshore wells.

In one valve type, the sealing is achieved by a movable flap hinging on a cross shaft on the lower valve part so as to be capable either of closing perpendicularly to the valve axis due to spring means associated with said flap, or of closing due to the thrust of a tubular slide hydraulically displaced within the valve. Presently the flaps hinge about cylindrical shafts which are precisely set into a bore of the valve body. As a rule, an end screw locks the shaft, however such an assembly makes valve maintenance difficult. The removal of the flap shaft is difficult and usually done by hammering, whereby the shaft and the surrounding parts may be damaged. Furthermore, the holding screw is permanently immersed in the corrosive well fluid and therefore tends to break after some use, whereby disassembly is made substantially more difficult. Also, as regards manufacture, the precise machining of the flap shafts at very tight tolerances and their required precise assembly run up the costs.

The primary object of the present invention is to overcome the above cited drawbacks of the known flap-type valves in order to make maintenance easier and to reduce the manufacturing costs.

Another object of the invention is to eliminate the need for precise machining and setting of the flap shafts by providing in novel manner for their fixation both with regard to rotational and translational movement.

Further object of this invention is to permit exceedingly easy and quick assembly and disassembly of the flaps without any danger of degradation or jamming.

Still another object of the invention is to eliminate any auxiliary fixing component that might be subjected to the corrosive effects of the well fluids.

In order to facilitate comprehension, the valve of the invention is described being assumed in place in an oil well, the terms "high", "low", "upper", "lower" referring to that position.

DESCRIPTION OF THE INVENTION

The safety valve of the invention is of the type comprising a generally tubular valve body, a movable sealing flap hinging on a transverse shaft at the low part of the body and spring-loaded toward the closed position, a tubular slide located inside the valve body to force the flap toward the open position as this slide descends, a return spring biasing the slide toward an upper position corresponding to the flap being closed, and hydraulic displacing means for driving the slide downwardly to open the flap.

In the present invention, this valve is characterized in that the valve body comprises at its lower part a lower sleeve 7 threaded on its periphery near its low end, the flap hinges on its shaft in a body called the shutter body which is internally threaded near its upper end in order to be screwed around the sleeve. The flap shaft includes a heel arranged to be locked by the sleeve in order to screw the shutter body onto the sleeve.

As a result, the flap shaft is locked in assembly and unlocked in disassembly without any auxiliary component by merely screwing the shutter body onto the lower valve sleeve, or unscrewing therefrom. Accordingly the shaft may be manufactured with conventional tolerances and it can be put in place or removed without any difficulty.

In a preferred embodiment, the shutter body is provided with a transverse borehole for inserting the flap shaft, one end of this borehole comprising a seat suitable for receiving the heel of the flap shaft and to allow its rotation toward a locking position. The valve sleeve and the shutter body then are arranged in such a manner that the end of the sleeve projects into this seat to fix the body in place in order to lock the shaft heel.

Preferably the heel of the flap shaft is notched to cover by a notch surface the outer edge of the sleeve end when screwing is terminated, whereby the shaft will be locked perfectly well both in translation along its longitudinal direction and in rotation about the same direction.

Other features, purposes and advantages of the invention will become clear in relation to the following description and the attached drawings showing illustratively, but without implying restriction, an embodiment of this invention, the drawings.

DESCRIPTION OF THE DRAWINGS

FIG. 2 is an enlarged partial sectional view through a plane AA' of FIG. 3 offset from the axial plane;

FIG. 3 is an enlarged sectional view of the valve through a plane BB' of FIG. 2 perpendicular to the plane AA' and passing through the flap shaft;

FIGS. 5a, 5b and 5c are diagrams illustrating flap assembly and locking of the shaft.

DETAILED DESCRIPTION OF THE INVENTION

Figure 1:
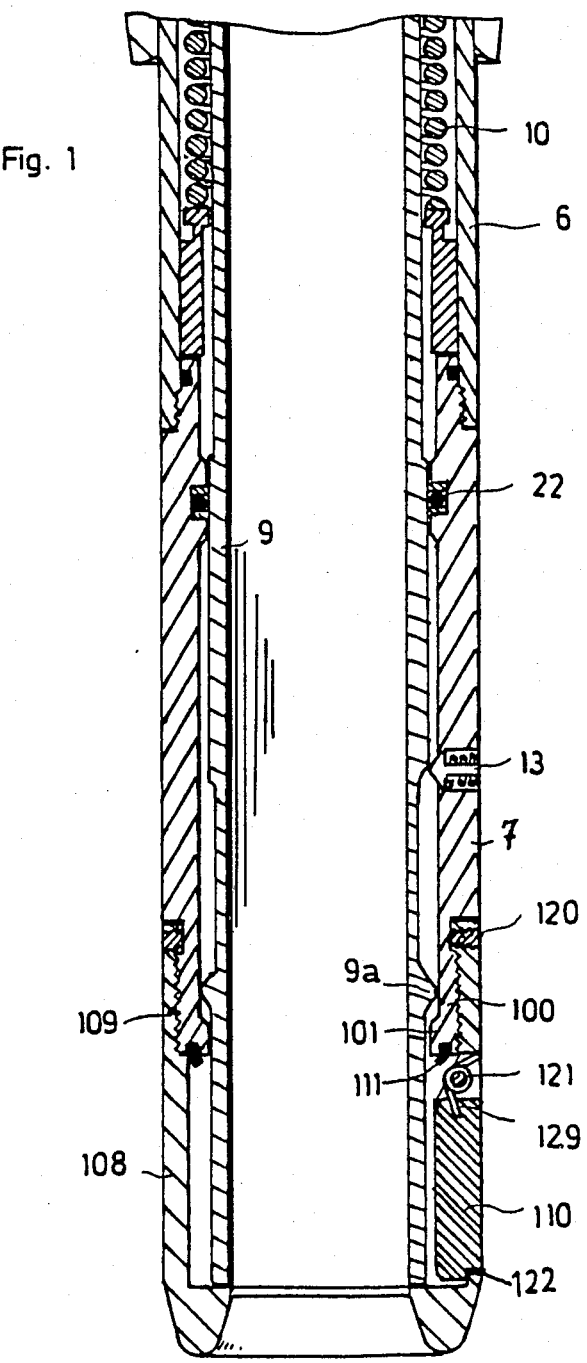
FIG. 1 is an axial sectional view along a vertical plane of the lower part of a valve of the invention.
Figure 4:
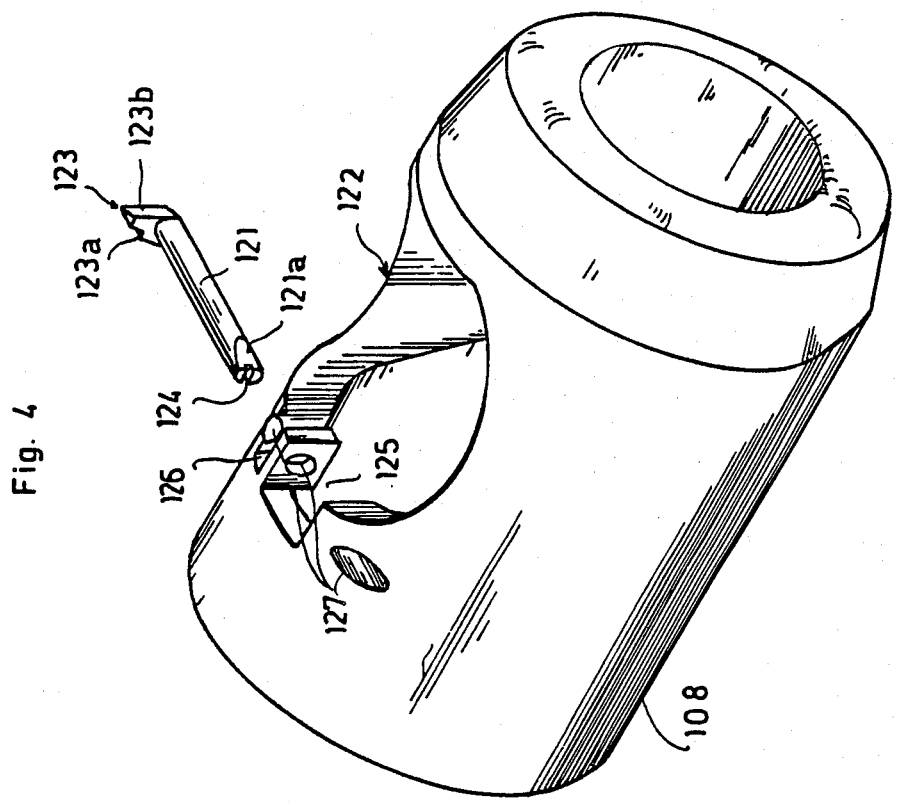
FIG. 4 is a schematic perspective view of the shutter body and of the flap shaft.

The safety valve shown in the drawings is for use in an oil-well production pipe. At the high or upper part it comprises in a conventional manner an anchoring latch (not shown) whereby it can be anchored and locked in a housing sleeve inserted into the production pipe. This housing sleeve comprises a control fluid intake to move downwardly a tubular slide 9 housed in the valve when the fluid is pressurized. This hydraulic displacement takes place on account of difference in slide cross-section acted on downwardly by the hydraulic fluid. This slide is biased upward by a return spring 10.

The control fluid is a lubricant and its circuit is located inside the valve between the valve body and the slide whereby the spring 10 is immersed in this fluid. This circuit is closed at the lower part by a seal 22.

The entire upper valve part may be conventional or designed according to one of the three U.S. patent applications entitled "CELL FOR TESTING THE SEALING QUALITY OF AN OIL WELL SAFETY VALVE, A TESTING PROCESS AND VALVE FOR USE THEREIN" of Jean-Luc Jacob, Ser. No. 06/924,460; "SAFETY VALVE FOR OIL-WELLS AND INSTALLATION TOOL FOR THE VALVE" of Jean-Luc Jacob, Ser. No. 06/924,438; and "OIL-WELL SAFETY VALVE AND TOOL FOR INSTALLING THE SAME" of Jean-Luc Jacob, Ser. No. 06/924,368, all filed on the same date as this application, the specifications of which are incorporated herein by reference, and therefore it will not be described in further detail herein.

This valve body comprises several tubular parts joined to each other and in particular at the low part by a spring case 6 and a lower sleeve 7. This sleeve 7 supports the already mentioned seal 22 and is conventionally provided with a compensating or balancing gate 13, which during the opening of the valve and while the slide 9 is initially descending, is acted on by a cam 9a of this slide in order to balance the pressures inside and outside the valve.

The sleeve 7 is provided at its base with a collar 100 threaded on its periphery. The inside surface of this collar is continuous with that of the sleeve while the tip of the collar is thickened by an internal projection 101 at the end of which is located a groove receiving a seal 111.

A shutter body 108 is assembled to the sleeve 7 and includes at its high part a threaded section 109 which screws around the collar 100 of the sleeve 7. In the assembled state, the outside of the shutter body 108 is continuous with the outside of the lower sleeve 7. A stop screw 120 eliminates any danger of accidental unscrewing.

The shutter body 108 includes a conventional sealing flap 110 hinging on the body by a shaft 121 whereby it can pivot between an open position (FIG. 1) in which the flap moves out of the way and is housed in a lateral aperture 122 in the body, and a closed position (FIG. 2) wherein the flap closes the sleeve 7 by resting with a conical bearing surface against the seal 111.

The shaft 121 comprises a cylindrical rod provided at one end with a projecting heel portion 123 and at the other end with a slot 124 whereby it can be made to pivot using a screwdriver. The projecting heel portion 123 is notched to form a rest 123a on one of its lateral sides. The other side 123b of the heel and the opposite end of the rod 121a are bevelled to prevent the shaft from projecting beyond the shutter body when inside it.

To hinge the flap by means of the above described shaft, the shutter is provided in the first place with a clearance 125 issuing into the aperture 122 at its upper part. Further, near this clearance, the body also comprises a recess 126 issuing into the aperture 122 at the high part and on its side, as shown in the drawings. The shape of this recess is such as to house the heel portion 123 of the shaft 121. This recess is arranged in such a manner that when the shutter body is fully screwed onto the sleeve 7, the end of this sleeve projects inside said housing 126 (FIG. 2) in order to lock the shaft heel.

The shutter body furthermore is entirely crossed by a cylindrical bore 127 of which the geometric axis passes through the recess 125 and the housing 126. The diameter of this borehole is suitable to pass through the shaft 121. Therefore this shaft 121 can be introduced into this borehole from the side of the housing 126 to cross the housing, then the recess 125, its end finally being seated in the end of the borehole 127.

In conventional manner the flap 110 is provided with a perforated double collar 128 rigidly fixed to the edge of the flap. The recess 125 assumes a shape suitable to hold this double collar as seen in FIG. 3. A helical spring 129 is located between the two parts of the collar 128, one of its ends being rigidly fixed to the flap and the other resting in the shutter body 108.

The assembly and disassembly of the flap using the shaft 121 are illustrated in FIGS. 5a, 5b, 5c; these steps are easily carried out requiring no impacting tools at all. Because the shutter body is not mounted on the valve sleeve, or being only partly screwed on it as shown by FIG. 5a, it suffices to move in place the flap by arranging its double collar 128 into the recess 125, the spring having been previously inserted between the two collars. Next the shaft 121 is inserted with an easy-fit into the borehole 127 at the end of this borehole which is near the housing 126. To make possible this insertion, the heel is pointing outward as shown in FIG. 5a. When the shaft is entirely engaged, its heel reaches the housing 126. This housing is big enough to allow rotating the shaft 121. Its heel is received in the recess, the heel rest 123a pointing to the inside of the shutter body as shown in FIG. 5b.

Thereupon the shutter body 108 is screwed into the sleeve 7 until its end rim 100a covers the rest 123a and locks it at the end of the screwing step (FIG. 5c). The shaft 121 then is entirely locked both with respect to rotation and translation. It should be noted that the seal 111 on the lower rim of the sleeve 7 is offset toward the inside rim of this sleeve (due to its thickened end) so as to act as a rest for the flap 110 without being in contact with the shaft heel portion 123. When the tubular valve slide 9 is in the high position, the flap is forced against this seal by the helical spring 129.

It should also be noted that when in its locked position, the heel portion 123 is wholly withdrawn into the housing 126 (because of the suitable cut of its side 123b) whereas the other end of the shaft 121 is wholly withdrawn into the borehole 127 (due to the above mentioned bevel 121a).

To disassemble the flap, it suffices to unscrew the shutter body 108 from the sleeve 7 so as to now allow the shaft 121 to rotate. Next this shaft is made to pivot by a screwdriver acting on its slot 124 in order to move the heel 123 out of the housing 126. Now free to translate, the shaft then may be removed.

While this invention has been described as having preferred features and embodiments, it will be understood that it is capable of still further modification and adaptation within the spirit of the invention, and this application is intended to cover all variations, adaptations, modifications and alternatives as may fall within the spirit of the invention and scope of the appended claims.

We claim:

1. A safety valve for use in an oil-well production pipe for closing or opening the pipe, said valve comprising a valve body of generally tubular shape, a movable shutter flap (110) hinging on the lower portion of the body by means of a transverse shaft (121) and biased toward a closed position by spring means (129), a tubular slide (9) located inside the valve body for forcing the valve toward the open position when descending, a return spring (10) biasing the slide toward a high position corresponding to the closed position of the flap, and hydraulic displacing means for driving the slide into its descending motion to open the flap, said valve body having at its lower portion an inside sleeve (7) threaded on its periphery (100) near its lower end, said shaft (121) passing through a transverse borehole in a shutter body (108) threaded on the inside thereof near its upper end (109) in order to screw on said sleeve, said flap shaft (121) hingedly mounting said flap (118) and including a projecting heel portion (123) adapted to be locked by said sleeve (7) at the end of the screw-on operation of the shutter body (108) on said sleeve (7), said shutter body (108) having a recess for receiving said projecting heel portion (123) of said shaft near the end of said borehole and permitting rotation of said flap shaft toward a locked position, said valve sleeve (7) and said shutter body (108) being arranged in such a manner that the sleeve end (100a) projects into said recess (126) at the end of the screw-on operation of the body on the sleeve in order to lock the projecting heel portion of said shaft.

2. A safety valve as in claim 1, and wherein the heel portion (123) of the flap shaft is notched to form a surface (123a) for covering the outer rim end (100a) of the sleeve at the end of the screw-on operation of the body on said sleeve.

3. A safety valve as in claim 2, and wherein the lower end of the sleeve includes a seal (111) offset toward the inner end rim of said sleeve so as to be a rest for the flap (110) in its closed position without making contact with the shaft heel portion (123).

4. A safety valve as in claim 1, and wherein the shutter body (108) includes a lateral aperture (122) for holding the flap (110) in its open position, the shaft borehole (127) being located in the shutter body near and above said aperture (122), the housing (126) for the shaft heel portion having a notch issuing into said aperture on its side and upper part.

5. A safety valve as in claim 4, wherein the shaft (121) retains the flap (110) by means of a perforated double collar (128) which is part of said flap, said double collar being housed in a recess (125) of the shutter body issuing into said aperture (122) at its upper part, said recess (125) containing a helical spring (129) enclosing the flap shaft (121) with one of its ends rigidly fixed to the flap (110) and the other resting against the shutter body (108) so as to bias the flap toward the closed position.

* * * * *